United States Patent [19]

Chen et al.

[11] Patent Number: 4,808,285
[45] Date of Patent: Feb. 28, 1989

[54] METHOD OF MAKING MICRO-OPTICAL COMPONENTS ON POLYDIACETYLENE OPTICAL DEVICES

[75] Inventors: Yung-Jui Chen, Weston; Boris S. Elman, Brighton; Gary M. Carter, Lexington, all of Mass.

[73] Assignee: GTE Laboratories Incorporated, Waltham, Mass.

[21] Appl. No.: 852,873

[22] Filed: Apr. 16, 1986

[51] Int. Cl.$^4$ ............................................. B01J 19/68
[52] U.S. Cl. ........................ 204/157.15; 204/157.63; 204/157.61; 156/643
[58] Field of Search ................... 204/157.15, 157.41, 204/157.63, 157.44, 901; 156/643; 350/96.34

[56] References Cited

U.S. PATENT DOCUMENTS 4,220,747 9/1980 Prexios et al.
4,439,514 3/1984 Garito .............................. 350/96.34

OTHER PUBLICATIONS

Chartier, Integrated Optics, pp. 49–72.
Spannring et al., Chemical Physics Letters, vol. 84, No. 1, Nov. 15, 1981, pp. 54–58.
Garito et al., Laser Focus, Feb. 1982, pp. 59–64.
Richter et al., Chemical Physics Letters, vol. 92, No. 1, Oct. 8, 1982, pp. 4–6.
Spaulding et al., Bull. Am. Phy. Soc. (Mar. 1985) Ku II, p. 582.

Primary Examiner—T. Tung
Assistant Examiner—Ben C. Hsing
Attorney, Agent, or Firm—Ivan L. Ericson

[57] ABSTRACT

A method of making Y couplers and grating optical waveguides of the present invention comprises exposing the polydiacetylene to an e-beam or a similar exposing means causing a change in the index of refraction of the polydiacetylene. In the case of e-beam exposure, the optical component patent is produced by directly controlling the e-beam which does not require any physical and/or chemical preparation of the polydiacetylene. The depth of penetration of the e-beam is controlled by the scanning rate and intensity of the e-beam. The optical gratings, fabricated by e-beam exposure technique, also inherit nonlinear optical properties which can be utilized in nonlinear optical applications.

6 Claims, 2 Drawing Sheets

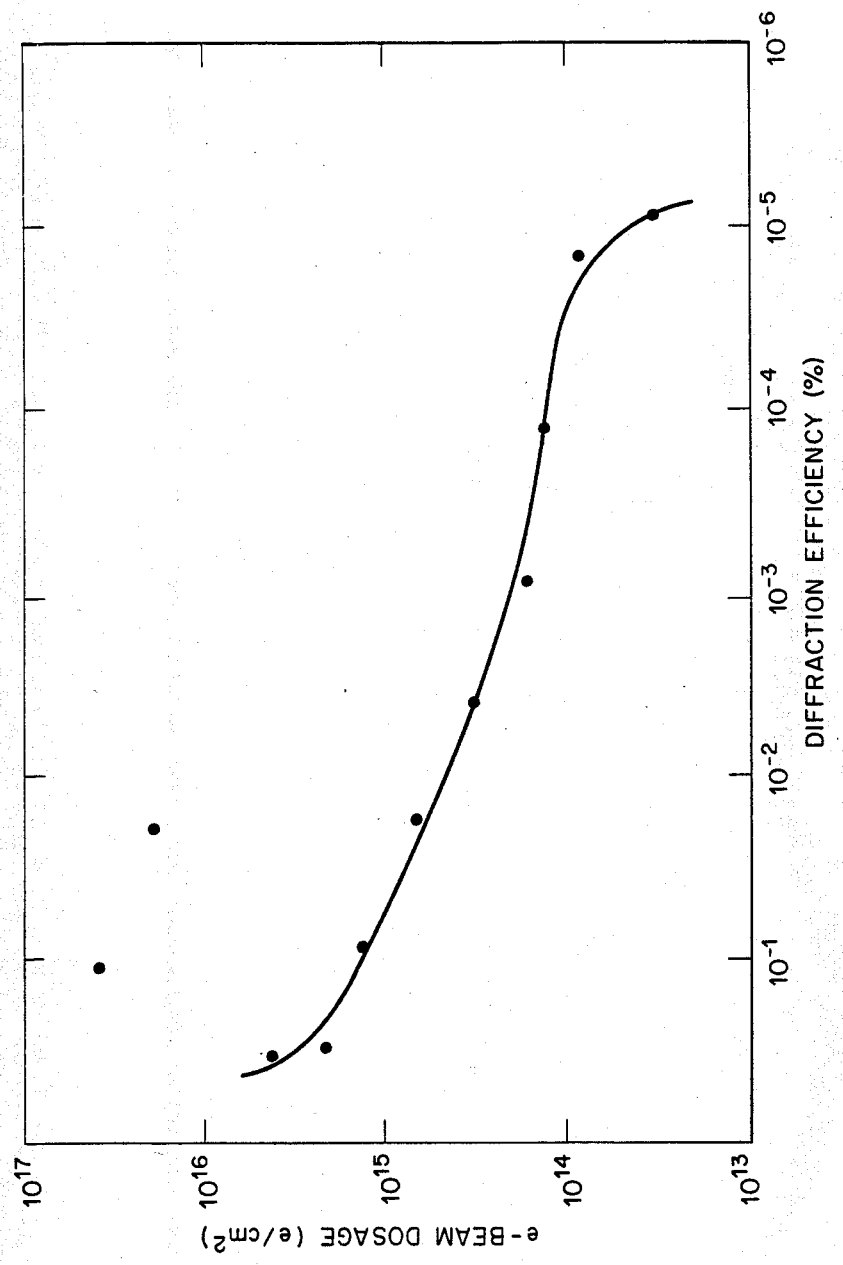

METHOD OF MAKING MICRO-OPTICAL COMPONENTS ON POLYDIACETYLENE OPTICAL DEVICES

FIELD OF THE INVENTION

This invention relates to a method of making optical devices having micro-optical components. More particularly, this invention relates to a method of making polydiacetylene optical devices having micro-optical components.

BACKGROUND OF THE INVENTION

There is considerable interest in using polydiacetylenes (PDAs; a class of organic polymers), in integrated optics applications. As an example in U.S. Pat. No. 4,431,263 to Garito, the use of diacetylene species and polymers formed therefrom to provide nonlinear optic waveguide materials is discussed.

Process procedures such as Langmuir-Blodgett deposition techniques, and ion-beam processing techniques have been proposed to fabricate waveguides from thin film or bulk PDAs. To utilize the PDA waveguide in actual integrated optics, micro-optical components of microscopic size (for example, gratings) have to be fabricated in or on the PDA waveguides. As an example, K. H. Richter, W. Guttler and M. Schwoerer in their article *Holographic Gratings on Diacetylene Single-Crystal Surfaces*, published in Chemical Physics Letters, pp 4–6, Vol. 92.1, Oct. 8, 1982, discuss a method of producing gratings on the surface of a fresh monomeric (PTS-diacetylene) single-crystal by the use of plane wave holograms.

J. J. Spaulding, S. E. Rickert, and J. B. Lando, in their talk entitled, *Resist Applications of Ultrathin Diacetylene Films,* abstract published in Bull. Am. Phys. Soc. p. 582, March 1985, stated that electron beam lithography of diacetylene multilayers has been performed, resulting in the production of both positive and negative resists and that the negative resist formed by a novel technique in which the material is selectively vaporized by e-beam heating.

SUMMARY OF THE INVENTION

In accordance with one aspect of the present invention, a new and improved method of making a micro-optical component on a polydiacetylene optical device comprises the following steps:

Step 1—An e-beam means is positioned over an surface of a polydiacetylene optical device. The surface is polydiacetylene having an index of refraction.

Step 2—The surface of the polydiacetylene optical device is exposed to an e-beam having a fluence and an energy at predetermined locations on the surface of the polydiacetylene optical device to form a micro-optical pattern. The fluence comprises a scanning rate and a current.

Step 3—The fluence and energy of the e-beam are controlled to change the index of refraction of the exposed polydiacetylene surface at the predetermined locations and at a predetermined depth to form a micro-optical component on the polydiacetylene optical device.

BRIEF DESCRIPTION OF THE DRAWING

In the drawing:

FIG. 3 is a curve depicting experimental results on the diffraction efficiency as a function of e-beam dosage in accordance with the present invention.

For a better understanding of the present invention, together with other and further objects, advantages and capabilities thereof, reference is made to the following disclosure and appended claims in connection with the above-described drawing.

DETAILED DESCRIPTION OF THE INVENTION

In this invention electron beams are used to fabricate micro-optical components on thin films or bulk polydiacetylene (PDAs) optical devices. The advantages of the processing technique are as follows:

(1) The high resolution electron beam lithographic systems are commercially available and can be used together with CAD/CAM to generate complex structures for integrated optics applications.

(2) The process is "direct write", which does not require any chemical and/or physical treatment of the PDA substrate. Therefore, the process will not deter the properties of PDA, other than in the e-beam exposed region.

(3) The e-beam systems has the submicron resolution capability which is required for fabricating many of the optical components, (e.g., the grating coupler for a waveguide with an index of refraction of 1.5–2 at a wavelength of 1.0 microns typically has a periodicity of less than one micron and a distributed feedback grating requires a period half of that).

(4) Since the optical components are processed "individually" in this direct write process, different processing parameters (e.g. e-beam energy and/or current and scanning rate) can be used to process different desirable optical components on the same wafer in one processing run.

Two examples, one, a grating structure 10, (FIG. 1), and another, a Y-coupler 100, (FIG. 2), are illustrated.

Figure 1:
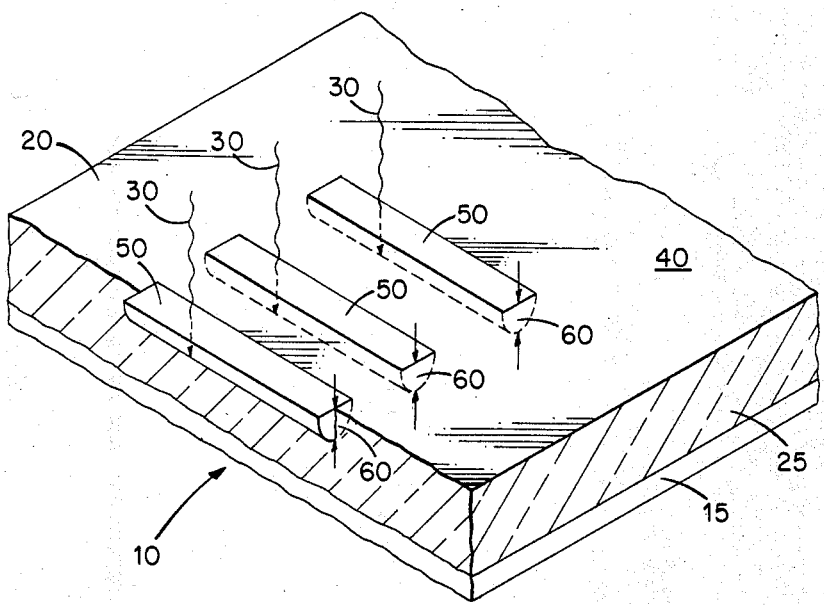
FIG. 1 is a partially cut-away perspective view of a grating structure in accordance with the present invention.

An example of using e-beam direct write to make a "grating" on a bulk or thin film PDA is illustrated in FIG. 1.

Shown in FIG. 1, is a grating structure 10 on an optical waveguide, a polydiacetylene core 25 which has a surface 20 and a substrate 15 which serves as the waveguide cladding layer. The surface 20 is exposed by e-beam 30 to change the index of refraction of the polydiacetylene in a predetermined region 50 to a depth 60. Surface 40 of the polydiacetylene core 25 is not exposed by the e-beam. This process is done by the control of the e-beam source without any physical and-/or chemical pre and post treatment of the polydiacetylene optical device. The linewidth of the polydiacetylene core region 50 determines the "finest" grating which can be made by this process. (For a state of the art commercial e-beam lithographic system, a period of 2000 Å–5000 Å can be achieved). The amplitude of the grading which is determined by the depth 60 and the index of refraction change due to the e-beam exposure can be controlled by the energy and fluence of the e-beam.

Figure 2:
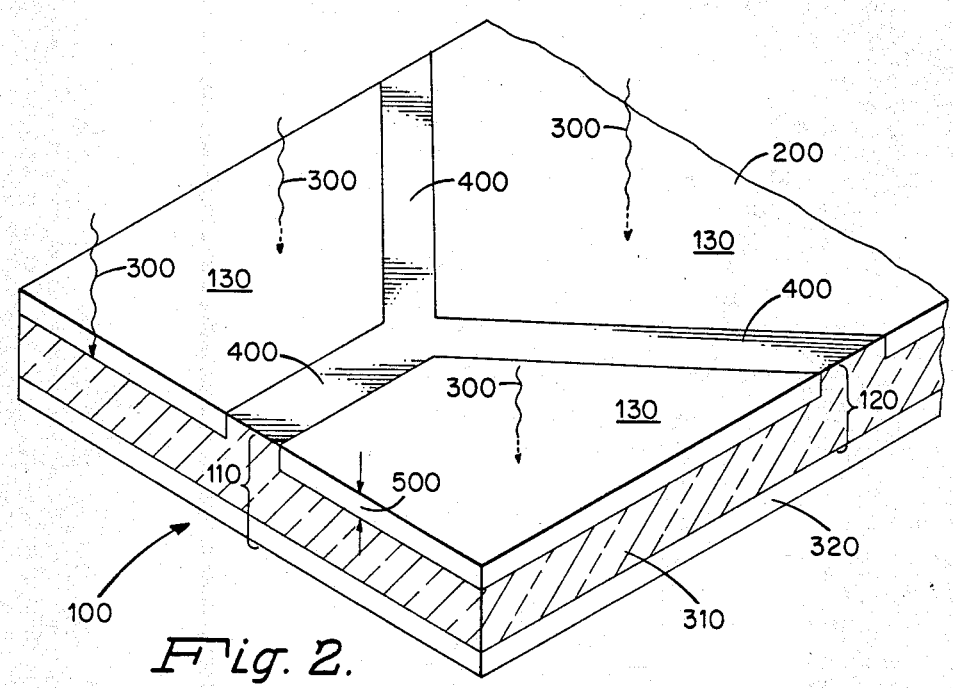
FIG. 2 is a partially cut-away perspective view of a Y-coupler in accordance with the present invention.

FIG. 2 depicts an example of using e-beam direct write to fabricate a Y-coupler 100 on a PDA planar waveguide 110 having a cladding substrate 320 and a polydiacetylene core 310. In this case the energy and the beam current are adjusted so that the whole PDA film 130 will be exposed evenly by e-beams 300 to form an unexposed Y-coupler pattern 400 on the surface 200 of the PDA planar waveguide 110 to a depth 500. If the exposed PDA surface 130 has a smaller index of refraction (which can be achieved by properly choosing the polymer material and/or optical wavelength of operation), the waveguides can be made to be monomode channel waveguides by chosing the proper polydiacetylene core thickness and the channel waveguide width.

(3) The e-beam changes the optical property of the exposed PDA surface 130 by increasing or decreasing its index of refraction, depending on the material and the optical wavelength of operation, and thus an "optical" structure is fabricated. The energy and the beam current provide a control of the process. The energy of the e-beam determines the penetration depth 500 and thus the depth of the optical structure. Low energy electrons have short penetration depth and high energy electrons have a greater penetration depth. The beam current determines the amount of the change in the optical index of refraction. FIG. 3 shows the effect of beam current on the "diffraction efficiency" (which reflects the amount of change of index of refraction n by e-beam exposure) of an "optical" grating fabricated by e-beam direct write on Langmuir-Blodgett (LB) 15-8 polydiacetylene film (3000 Å thick). The energy of the e-beam, from a commercial e-beam lithographic system, was 20 keV. The scanning rate of the beam was 1 MHz and the beam current was $10^{-8}$ amp to $5 \times 10^{-10}$ amp. Other scanning rates such as 0.01, 0.3, 0.6, and 1.2 can be used.

It has been found experimentally that the new process can be controlled over a large range by the control of the beam current.

For nonlinear optical applications, the e-beam exposed optical components have another unique feature. For an ordered PDA substrate (e.g., a single crystal film) the exposed area, due to the damage by the electron beam, will have a much smaller optical nonlinearity (the reduction can be controlled by e-energy and fluence). Therefore, one also produces a "nonlinear optical" pattern by the e-beam exposure process. This phenomenon can be applied to many nonlinear optical applications. (e.g. U.S. Pat. No. 4,497,535 by H. G. Winful).

The proposed direct write processing concept can also be applied to other exposing means such as ion-beam, optical beam, such as laser beam, and x-ray exposure as well as the e-beam exposure.

Summary—An optical device can have a single crystalline and/or polycrystalline polydiacetylene core and an appropriate cladding substrate, which can be another polymer, a diacetylene monomer, or another material. The polydiacetylene core of the optical device is characterized by an index of refraction which is larger than that of the substrate in the operating wavelength region so that at least one waveguide mode exists in the optical device. A desired pattern is exposed on the polydiacetylene core by the e-beam direct write technique. The energy and the current of the e-beam source determines the depth of the exposed region and the amount of change of the index of refraction of the polydiacetylene. Since the e-beam exposure damages the backbone electronic states of the polydiacetylene, a reduction of the index of refraction is expected in the wavelength upon which lies below the optical transition energy gap of the polydiacetylene.

The method of this invention provides the requisite submicron resolution of micro-components on PDA optical devices utilizing existing commercial equipment without deterring the optical properties of the PDA. This method also minimizes the possibility of contamination at the critical index of refraction boundary areas thereby providing a superior optical device.

While there has been shown and described what is at present considered the preferred embodiment of the invention, it will be obvious to those skilled in the art various changes and modifications may be made therein without departing from the scope of the invention as defined by the appended claims.

What is claimed is:

1. A method of making a micro-optical component on a polydiacetylene optical device comprising the following steps:

Step 1—positioning an e-beam means over a surface of a polydiacetylene optical device, said surface being polydiacetylene having an index of refraction;

Step 2—exposing said surface of the polydiacetylene optical device to an e-beam having a fluence and an energy at a predetermined location on said surface of said polydiacetylene optical device to form a micro-optical pattern, said fluence comprising a scanning rate and a current; and Step 3—controlling said fluence and energy of said e-beam to change said index of refraction of said exposed polydiacetylene surface at said predetermined location and at a predetermined depth to form a micro-optical component on said polydiacetylene optical device.

2. A method in accordance with claim 1 wherein said fluence and energy of said e-beam comprises a scanning rate of said e-beam from about 0.01 to about 1.2 MHz and a current of said e-beam of from about $10^{-8}$ amp to about $5 \times 10^{-10}$ amp at about 20 keV.

3. A method in accordance with claim 1 wherein said polydiacetylene optical device comprises a Y-coupler.

4. A method in accordance with claim 1 wherein said polydiacetylene optical device comprises an optical waveguide having a grating.

5. A method in accordance with claim 1 wherein said polydiacetylene optical device comprises an optical waveguide having a nonlinear optical grating.

6. A method in accordance with claim 1 wherein said polydiacetylene optical device comprises an optical waveguide having a linear optical grating.

* * * * *